United States Patent
Palatov et al.

(10) Patent No.: US 11,668,780 B2
(45) Date of Patent: Jun. 6, 2023

(54) STATIONARY ELECTRONIC BEACON WITH MAP

(71) Applicant: SECOND BRIDGE INC., Beverly Hills, CA (US)

(72) Inventors: Dennis Palatov, Portland, OR (US); Marc Ganouna, Beverly Hills, CA (US)

(73) Assignee: SECOND BRIDGE INC., Beverly Hills, CA (US)

( * ) Notice: Subject to any disclaimer, the term of this patent is extended or adjusted under 35 U.S.C. 154(b) by 194 days.

(21) Appl. No.: 17/297,964

(22) PCT Filed: Dec. 9, 2019

(86) PCT No.: PCT/IB2019/060560
§ 371 (c)(1),
(2) Date: May 27, 2021

(87) PCT Pub. No.: WO2020/121157
PCT Pub. Date: Jun. 18, 2020

(65) Prior Publication Data
US 2022/0091214 A1 Mar. 24, 2022

(30) Foreign Application Priority Data
Dec. 11, 2018 (FR) ...................... 18 72661

(51) Int. Cl.
*G01S 1/68* (2006.01)
*G01S 1/08* (2006.01)
*G01C 21/10* (2006.01)
*G01S 1/04* (2006.01)

(52) U.S. Cl.
CPC ................. *G01S 1/68* (2013.01); *G01C 21/10* (2013.01); *G01S 1/042* (2013.01); *G01S 1/08* (2013.01)

(58) Field of Classification Search
CPC ... G01S 1/68; G01S 1/042; G01S 1/08; G01C 21/10
USPC .......................................................... 342/386
See application file for complete search history.

(56) References Cited

U.S. PATENT DOCUMENTS

| 5,944,768 A | 8/1999 | Ito et al. |
| 9,927,249 B2* | 3/2018 | Barnard .................. H04W 4/40 |
| 10,049,455 B2* | 8/2018 | Wirola ...................... G06T 7/70 |
| 2010/0109864 A1 | 5/2010 | Haartsen et al. |
| 2011/0043373 A1 | 2/2011 | Best et al. |

FOREIGN PATENT DOCUMENTS

WO   2015/170228 A1   11/2015

* cited by examiner

*Primary Examiner* — Harry K Liu
(74) *Attorney, Agent, or Firm* — H&I Partners; C. Andrew Im

(57) ABSTRACT

An electronic beacon placed stationary in a known location. The beacon includes a map, stored therein, pertaining to a covered area. The map includes coordinates of the known location with reference to the map. The electronic beacon is configured to transmit at least a navigational signal. The electronic beacon has a radio transmitter to communicate the map to at least one moving device in the covered area.

8 Claims, 4 Drawing Sheets

STATIONARY ELECTRONIC BEACON WITH MAP

RELATED APPLICATIONS

This application is a § 371 application of PCT/IB2019/060560 filed Dec. 9, 2019, which claims priority from French Patent Application No. 18 72661 filed Dec. 11, 2018, each of which is incorporated herein by reference in its entirety.

FIELD OF THE INVENTION

The present invention relates to means and methods for navigation utilizing electronic beacons.

BACKGROUND OF THE INVENTION

The use of stationary electronic beacons for navigation is well known. Some examples include LORAN and VOR for long-range ship and aircraft navigation, Differential GPS ground stations to compute and transmit a correction signal for satellite navigation, and the use of a variety of Anchor devices for indoor and outdoor tracking of Tag devices.

Mobile devices customarily use a Map obtained in advance, relative to which the position of the electronic beacon is known. The devices then utilize the beacon's Navigation Signal and the beacon's known position to determine their own position on the Map. Methods for doing so are known which are specific to various types of beacons and Navigational Signals in the art.

The common parameters to all known electronic beacon types are a known location of the beacon, and the transmission of a signal that can be used for navigation by the receiving device. In some cases, such as VOR and some phased-array beacons, the signal is directional and is able to provide bearing from beacon to receiving device. Some signals types are also able to provide distance measurement between beacon and receiving device. Examples include VOR-DME and a variety of short-range technologies such as UWB, LoRa, and the like. Another type of beacon, such as Differential GPS base stations, transmit a correction signal to make an external technology such as GPS more precise by enabling the receiving device to correct for locally existing main signal deviations.

The known electronic beacon types enable the receiving device to compute, or enable higher precision in computing, the device's coordinates. This enables knowing the location of the device in a given coordinate system, however it does not by itself fully enable Navigation. Within the context of the present invention Navigation is the task of planning a specific course or path of travel to be taken from present location to another destination.

In order to Navigate, a receiving device needs to know the location of any local obstacles, hazards, and available or preferred travel paths such as roads, lanes, hallways, stairs and the like. Within the context of the present invention, such information comprises a Map. Maps are well known and numerous types of maps exist, both in printed and digital form.

In common practice, in order to Navigate electronically a device must first obtain a Map pertinent to the current location. Then, receiving a Navigational Signal from a stationary beacon with a known location, the device is able to determine its present position on the Map and subsequently plan a route to a destination using the information contained within the Map.

Ordinarily Maps are obtained from a publishing authority such as Government or private entities like Google. This is done either on demand by means of a wireless Internet connection or by storing the map in the device in advance. In cases of indoor Navigation, Maps are typically generated by the system operator from building blueprints, factory floor layouts and the like.

In order to be useful, Map must be accurate and current. Ensuring this and distributing updates by a central issuing authority is an ongoing challenge. While the relatively slow pace of road construction makes such updates manageable for street maps, the often rapidly changing environment in locations where large obstacles such as equipment, storage containers and the like are frequently moved, local ongoing maintenance of the Map is highly desirable.

Maintaining the necessary level of detail for accurate Navigation is also difficult when broad coverage is needed involving thousands of locations. Additionally, a device must be able to obtain the pertinent current Map where in some cases a wireless Internet connection may not be available, and where a current Map may not be available in advance.

What is needed is a means and a method of storing pertinent Map locally, and transmitting the current version to the receiving device in parallel with the navigation signal. This would allow the Map information to be maintained locally according to current conditions, and ensure that the most current version is always available to a receiving device that is Navigating using the Navigational Signal.

The stationary electronic beacon with Map of the present invention provides both the means and the method of accomplishing this goal.

SUMMARY OF THE INVENTION

The terms "invention", "the invention", "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The primary objective of the present invention is to provide the means and the method to enable a mobile receiving device to Navigate in Covered Area using Navigational Signal and Map received from a stationary Beacon, without the need to obtain a Map from another source.

The second objective of the preset invention is to provide means of locally maintaining and updating a Map stored in a stationary Beacon.

The third objective is to provide means and method of informing a plurality of mobile receiving devices Navigating using Navigational Signal and Map received from a stationary Beacon of each mobile device's location on the Map, as well as speed and direction.

Within the context of the present invention, Covered Area is the geographical area in the vicinity of the stationary Beacon that is represented on the Map stored in the Beacon. In many embodiments, Covered Area will be substantially similar or slightly greater than the reception range of the Beacon's Navigational Signal, although some embodiments may restrict or expand the Covered Area based on specific requirements.

In order to achieve the objectives, a Beacon of the present invention must have an electronic storage medium in which a Map can be stored, and a processing unit for receiving, storing, retrieving and communicating the Map to mobile receiving devices. A radio transmitter is also necessary for the transmission, and may be same or distinct from the transmitter used to transmit the Beacon's Navigational Signal.

Many types of electronic means are known, including nonvolatile memory, disk drives and the like. Processing unit means are also well known, as are methods for receiving, storing, retrieving and communicating a Map.

Numerous examples of radio transmitter are known. Some embodiments will implement radio transmitter that is broadcast only, however most will implement two-way communication capability with a plurality of mobile receiving devices.

Some embodiments will further implement methods of receiving Map update information from mobile receiving devices, and updating the Map accordingly. Known authentication and communications security protocols will typically be used to ensure authenticity and veracity of the update information.

Some embodiments of the present invention will further implement methods of periodically receiving status information from a plurality of mobile receiving devices, adding this information to the stored Map, and subsequently communicating the Map including the status information to one or more of said mobile devices. Status information may include position, heading, velocity and other information. A mobile device receiving this information within a Map may be enabled to avoid or interact with other devices whose status information is contained within the Map.

More specifically, the invention relates to an electronic Beacon placed stationary in a known location, said Beacon having a stored Map pertaining to the Covered Area, said Map comprising coordinates of said known location with reference to said Map, said Beacon being configured to transmit at least a Navigational Signal, said Beacon having a radio transmitter for communicating said Map to at least a moving device in said Covered Area.

According to a particular embodiment, said Navigational Signal comprises local correction information for satellite Navigational Signals.

According to a particular embodiment, said Map further comprises Position Information received from at least a moving device, said Position Information having a reference to said Map.

According to a particular embodiment, said Position Information received from at least a moving device further includes Motion Information, said Motion Information comprising at least a speed and a direction.

According to a particular embodiment, said Map comprises changes responsive to information received from a moving device.

According to a particular embodiment, said Navigational Signal comprises a distance measurement.

According to a particular embodiment, said Navigational Signal comprises a compass bearing information.

According to a particular embodiment, the Covered Area is the geographical area in the vicinity of the stationary Beacon that is represented on the Map stored in the Beacon.

According to a particular embodiment, the Covered Area is substantially similar or slightly greater than the reception range of the Beacon's Navigational Signal.

DESCRIPTION OF THE DRAWINGS

The invention will be better understood when reading the following description and examining the annexed Figures. These Figures are given only as an illustration and by no means as a restriction of the invention.

Identical, similar, or analogous elements share the same reference number throughout the Figures.

DETAILED DESCRIPTION OF THE REPRESENTATIVE EMBODIMENTS

Figure 1:
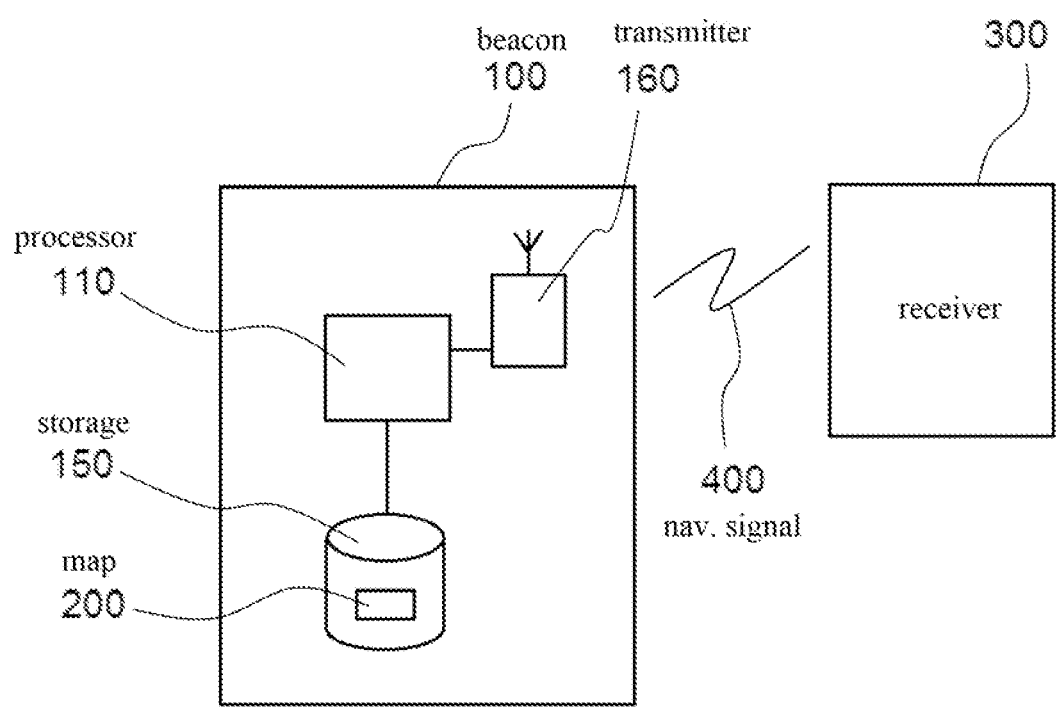
FIG. 1 is a diagram illustrating the essential components of the present invention.

FIG. 1 illustrates the unique and novel combination of the present invention of a stationary electronic Beacon 100, a digital Map 200 stored therein in storage means 150, and a means of transmitting said Map to a mobile receiving device 300 that is Navigating using the Beacon's Navigational Signal 400. The transmission of the Map is facilitated by Processing Unit 110 retrieving the Map from storage means 150 and transmitting it via radio transmitter 160. This combination is enabling of the objectives and is necessary in all embodiments.

Figure 2:
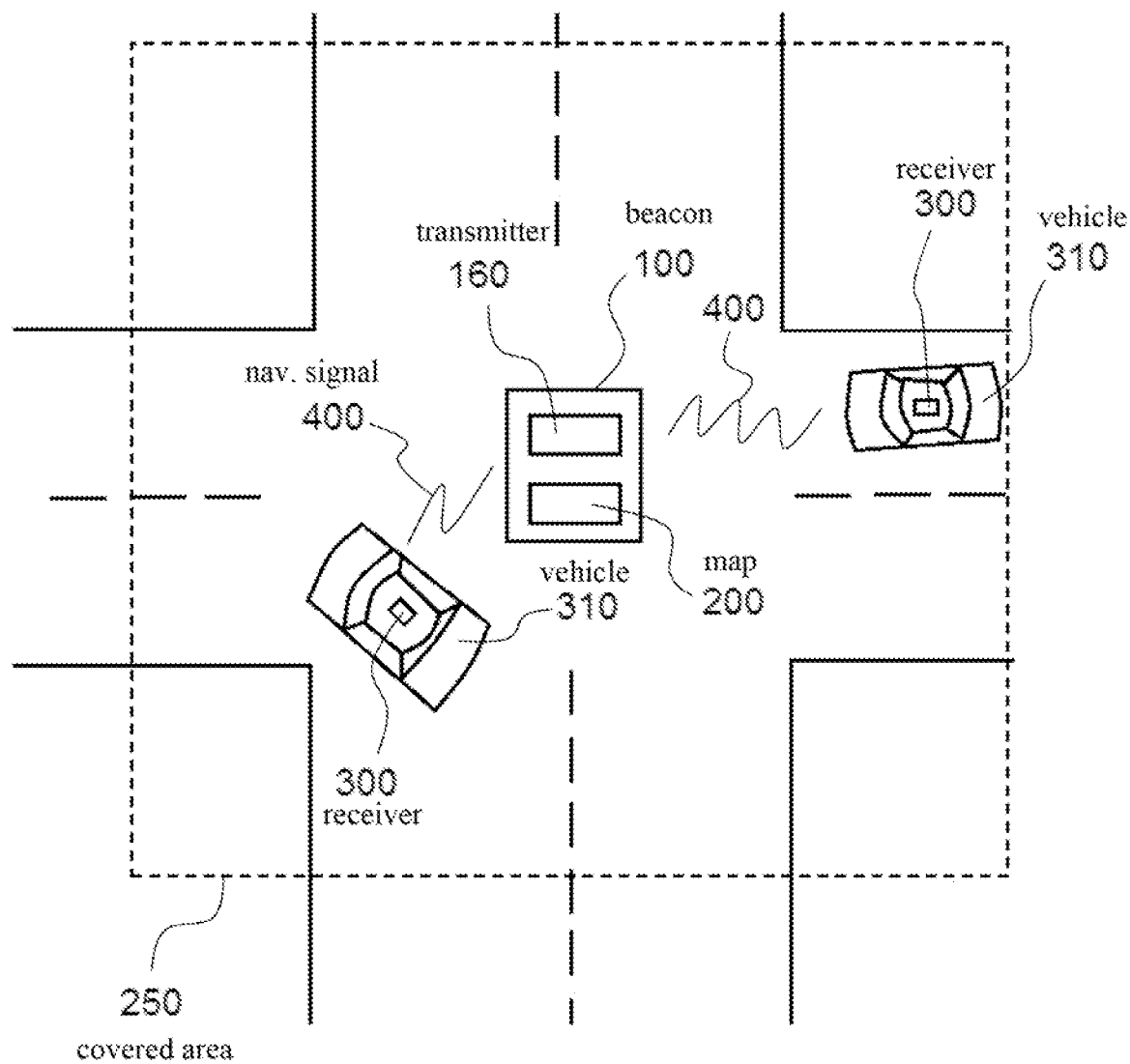
FIG. 2 illustrates an embodiment implementing a road traffic management device.
Figure 3:
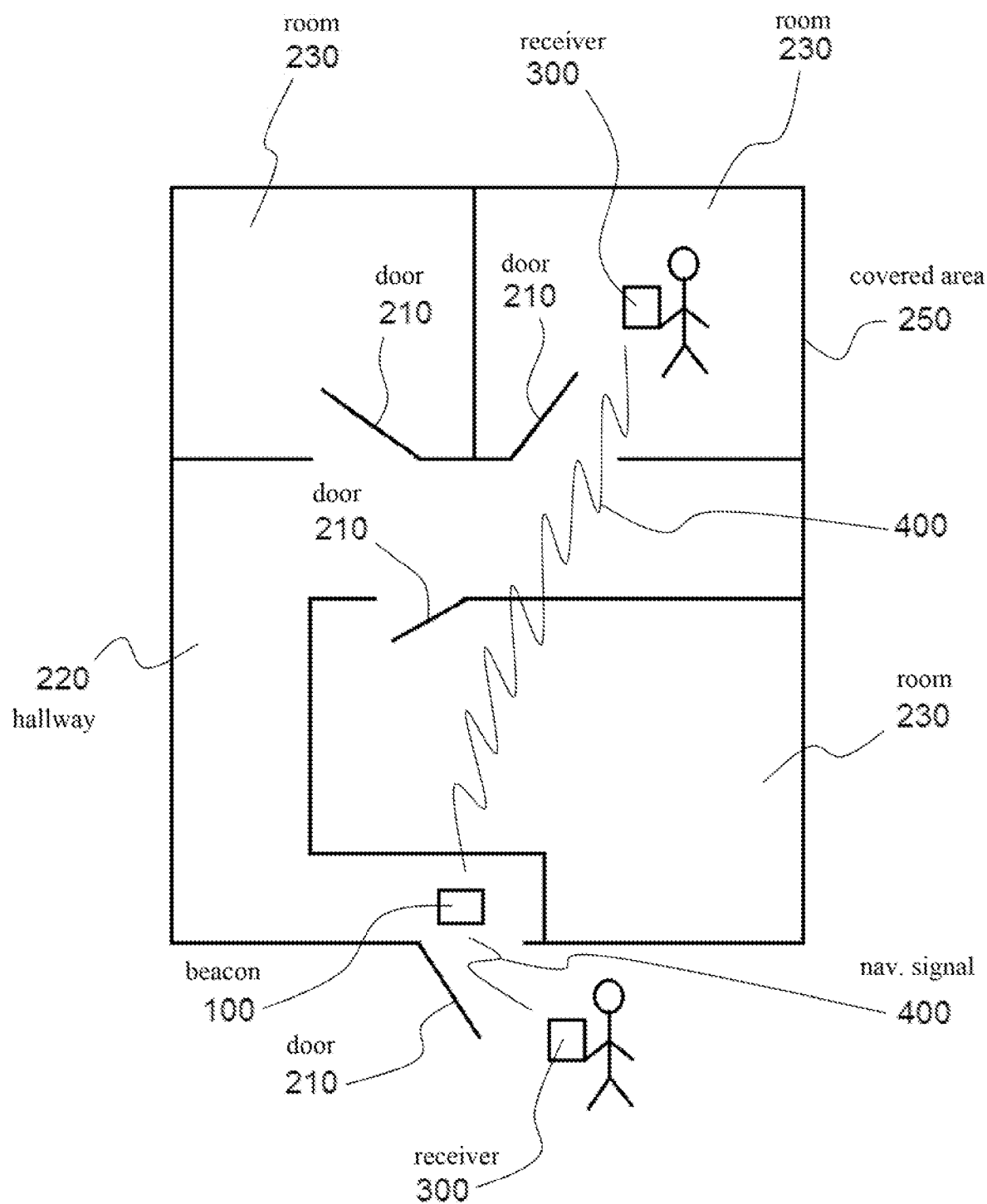
FIG. 3 shows an embodiment facilitating Navigation within a building.
Figure 4:
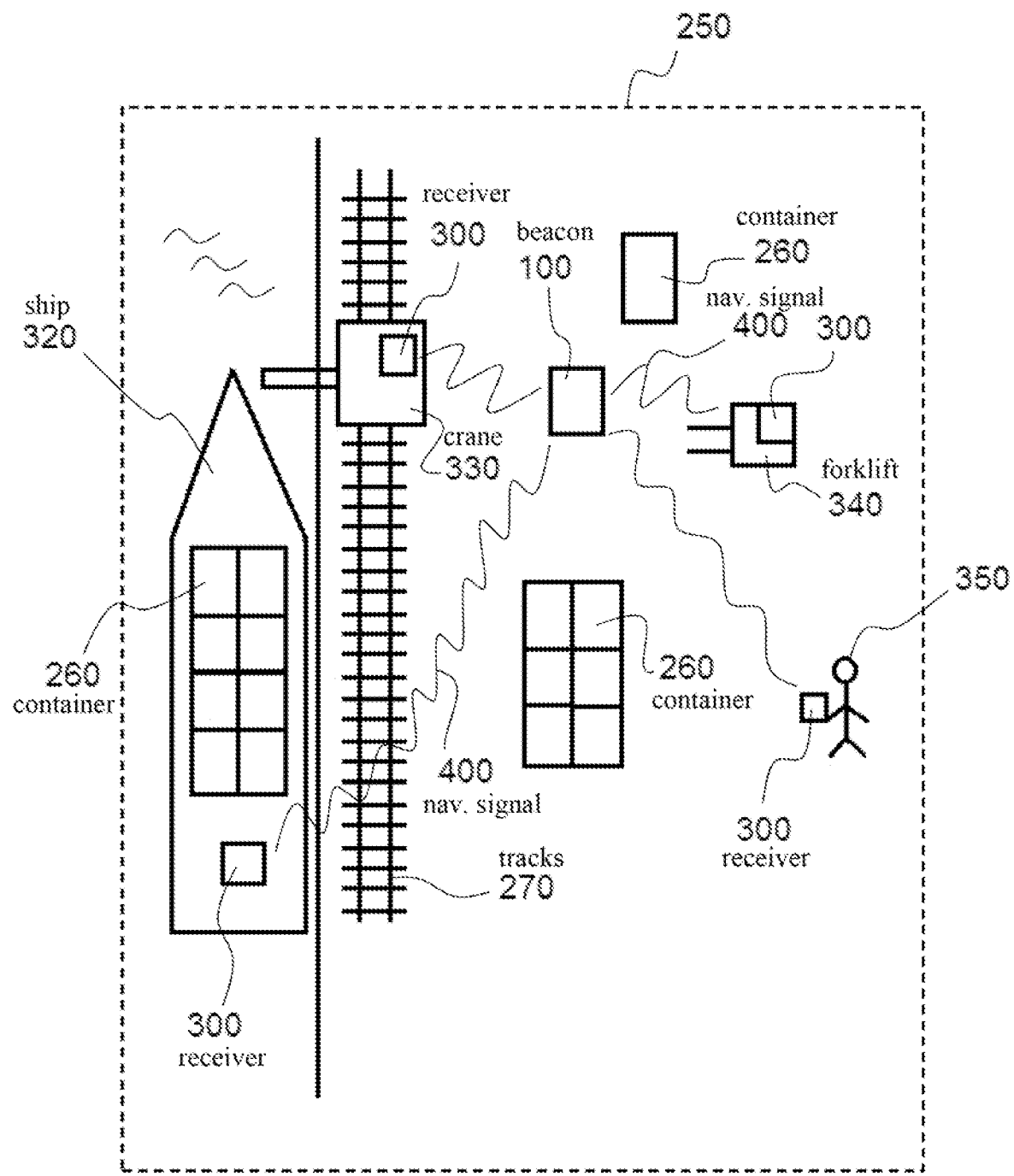
FIG. 4 shows an embodiment for managing a shipping port.

A first representative embodiment of the present invention is a road traffic management device and is illustrated in FIG. 2. The Beacon 100 is placed at an intersection, preferably elevated above the road surface and co-located with or incorporating a traffic light controller. The Beacon in this embodiment is configured as a Differential GPS base station, receiving GPS satellite signals, computing a correction signal, and transmitting said correction signal as its Navigational Signal 400. The Beacon of this embodiment further contains short-range radio transmitter 160, which may be WiFi or the like, for two-way communication with mobile receiving devices 300 installed in cars. The Navigational Signal may be communicated via the radio transmitter 160 or a separate transmitter without departing from the scope of the invention. In some embodiments the Navigational Signal may be included as information in the Map rather than transmitted separately.

A Map 200 comprising information about the Covered Area 250 is stored within the Beacon. The Map in this embodiment may contain dimensions and positions of traffic lanes, curbs, pedestrian crosswalks and the like. The Map would also typically contain status of traffic lights, if present, and would be updated whenever status is changed.

As a vehicle 310 approaches the intersection, it comes within the transmission range of the Beacon and starts receiving periodic Map updates. Once a Map is received and the vehicle's location relative to the Map is determined, the vehicle may communicate its location, speed, and intended travel path to the Beacon.

This information is then incorporated into the Map and transmitted to all other vehicles navigating within the Covered Area. If the Beacon also incorporates a traffic light controller function, the operation of the lights may be adjusted based on status information received from vehicles.

A second embodiment of the present invention is a Beacon placed in a building. The Navigational Signal 400 may be UWB radio or similar, that is capable of measuring the distance between the Beacon and a mobile receiving device. The Covered Area 250 comprises a floor of the building and the Map incorporates information about hallways 220, doors 210, rooms 230 and the like. Status of the doors 210 such as closed, open, or locked, may be included.

A visitor enters the building carrying or wearing mobile receiving device 300, which starts receiving the Navigational Signal 400 and receives the Map of the building from the Beacon. The mobile receiving device can now determine its position on the Map, and communicates this position to the Beacon for incorporation into the Map. The Map can be subsequently displayed to the visitor, showing the building features and locations of other visitors. The map can also be archived and transmitted to a monitoring location. Such archival and transmission means are well known and are outside the scope of the present invention.

A third embodiment of the present invention is a Beacon placed in a shipping port. The Navigational Signal 400 may be a short or medium range radio technology such as UWB or similar, that is capable of measuring the distance between Beacon and mobile receiving device. The Covered Area 250 may, as an example, include one loading bay where a crane 330 operates on tracks 270. A ship 320 is docked at the bay. The Map stored within the Beacon includes details of the Covered Area such as locations of the shipping containers 260, locations and motion information of forklifts 340 and workers 350. Each mobile receiving device 300 periodically receives updated Map from the Beacon, determines its position on the Map, and transmits its position and motion information to the Beacon. The Map is then updated, including any changes in location of shipping containers, and transmitted to all mobile receiving devices 300.

In any case, the mobile receiving device utilizes the beacon's Navigation Signal and the beacon's known position to determine their own position on the Map. Methods for doing so are known which are specific to various types of beacons and Navigational Signals in the art.

The invention claimed is:

1. An electronic beacon placed stationary in a known location, the beacon comprising a map, stored therein, pertaining to a covered area, the map comprising coordinates of said known location with reference to the map, the electronic beacon being configured to transmit at least a navigational signal, the electronic beacon comprising a radio transmitter to transmit the map to at least one moving device in the covered area;
   wherein the map further comprises position information received from said at least one moving device, the position information comprising a reference to the map; and
   wherein the position information received from said at least one moving device further comprises motion information, the motion information comprising at least speed information and direction information.

2. The electronic beacon of claim 1, wherein the navigational signal comprises local correction information for satellite navigational signals.

3. The electronic beacon of claim 1, wherein the map comprises changes responsive to information received from said at least one moving device.

4. The electronic beacon of claim 1, wherein the navigational signal comprises a distance measurement.

5. The electronic beacon of claim 1, wherein the navigational signal comprises compass bearing information.

6. The electronic beacon of claim 1, wherein the covered area is a geographical area in a vicinity of the electronic beacon that is represented on the map stored in the electronic beacon.

7. The electronic beacon of claim 1, wherein the covered area corresponds to a reception range of the navigational signal of the electronic beacon.

8. The electronic beacon of claim 1, wherein the covered area is greater than a reception range of the navigational signal of the electronic beacon.

\* \* \* \* \*